(12) United States Patent
Hattori et al.

(10) Patent No.: US 12,546,310 B2
(45) Date of Patent: Feb. 10, 2026

(54) ELECTRIC COMPRESSOR

(71) Applicant: KABUSHIKI KAISHA TOYOTA JIDOSHOKKI, Aichi (JP)

(72) Inventors: Yuya Hattori, Aichi (JP); Atsushi Nishizawa, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 18/775,007

(22) Filed: Jul. 17, 2024

(65) Prior Publication Data

US 2025/0035110 A1 Jan. 30, 2025

(30) Foreign Application Priority Data

Jul. 25, 2023 (JP) .................. 2023-120470

(51) Int. Cl.
*F04C 2/02* (2006.01)
*F04C 15/00* (2006.01)

(52) U.S. Cl.
CPC .......... *F04C 2/025* (2013.01); *F04C 15/0088* (2013.01); *F04C 2240/30* (2013.01); *F04C 2240/40* (2013.01); *F04C 2240/50* (2013.01); *F04C 2240/60* (2013.01)

(58) Field of Classification Search
CPC .. F04C 2/025; F04C 15/0088; F04C 2240/30; F04C 2240/40; F04C 2240/50; F04C 2240/60; F04C 18/344; F04C 2240/52; F04C 2240/808; F04C 23/008; F04C 18/0215; F04C 23/02; F04C 29/00; F04C 29/06; F01C 21/10
See application file for complete search history.

(56) References Cited

U.S. PATENT DOCUMENTS

| | | | |
|---|---|---|---|
| 2010/0084933 A1* | 4/2010 | Ishikawa | F01C 21/10 310/91 |
| 2011/0158833 A1* | 6/2011 | Murakami | F04C 23/008 417/422 |
| 2013/0294951 A1* | 11/2013 | Ishikawa | F04B 39/121 417/410.5 |
| 2017/0097048 A1* | 4/2017 | Knoth | F16C 17/08 |
| 2017/0229943 A1* | 8/2017 | Hattori | F01C 21/02 |
| 2019/0032974 A1* | 1/2019 | Oh | F04C 29/04 |
| 2019/0178257 A1* | 6/2019 | Iizuka | F16C 35/063 |
| 2019/0245404 A1* | 8/2019 | Hamana | H02K 1/165 |
| 2019/0264689 A1* | 8/2019 | Park | F04C 29/12 |
| 2021/0017992 A1* | 1/2021 | Park | F04C 23/008 |

FOREIGN PATENT DOCUMENTS

JP 2012-057504 A 3/2012

* cited by examiner

*Primary Examiner* — Matthew T Largi
(74) *Attorney, Agent, or Firm* — Greenblum & Bernstein, P.L.C.

(57) ABSTRACT

An electric compressor includes a housing, a rotary shaft rotatably supported in the housing, a motor that rotates the rotary shaft, and a compression part that compresses fluid. The housing includes a boss protruding toward the motor, and the boss has an inner peripheral surface in which a bearing that supports the rotary shaft is provided. The boss has an asymmetrical shape and has an outer peripheral surface that varies in distance from the inner peripheral surface in a radial direction of the rotary shaft. The rotary shaft is press-fitted in the bearing, and the bearing is fitted in the inner peripheral surface with a clearance between the bearing and the inner peripheral surface.

5 Claims, 6 Drawing Sheets

//ELECTRIC COMPRESSOR

CROSS-REFERENCE TO RELATED APPLICATION

This application claims priority to Japanese Patent Application No. 2023-120470 filed on Jul. 25, 2023, the entire disclosure of which is incorporated herein by reference.

BACKGROUND ART

The present disclosure relates to an electric compressor.

Japanese Patent Application Publication No. 2012-057504 discloses a conventional electric compressor. This electric compressor includes a housing, a rotary shaft rotatably supported in the housing, a motor configured to rotate the rotary shaft, and a compression part configured to compress fluid by the rotation of the rotary shaft. The housing has a boss formed in a tubular shape protruding toward the motor. A bearing that supports the rotary shaft is provided in an inner peripheral surface of the boss.

The bearing is specifically a ball bearing that has an inner ring, an outer ring, and a plurality of spherical bearing balls provided between the inner ring and the outer ring. Here, in this type of electric compressor, the rotary shaft is generally fitted in the inner ring of the bearing with a clearance between the rotary shaft and the inner ring, and the outer ring of the bearing is generally press-fitted in the inner peripheral surface of the boss, although details of such an aspect are not clearly disclosed in the Publication.

In recent years, an electric compressor has been required to be further downsized. With this requirement, a diameter of the housing is decreased. On the other hand, because of the decrease of the diameter of the housing, a space for the boss in the housing is difficult to ensure sufficiently. For this reason, the boss may be formed in a shape for avoiding interference with the other member provided in a motor chamber or, in contrast, may be formed in a shape integrated with a part of the other member. This complicates the shape of the boss, and the boss has an asymmetrical shape and has an outer peripheral surface that varies in distance from the inner peripheral surface in a radial direction of the rotary shaft. In short, a wall thickness of the boss is not uniform, that is, the boss has a thick wall portion and a thin wall portion.

Here, when a bearing is press-fitted into such a boss having various wall thicknesses, various deformation of the boss easily occurs during the press-fitting, and the boss is easily distorted. Then, the bearing held by the boss is also easily distorted because of the distortion of the boss.

As a result, there is a problem that durability of the bearing decreases. Furthermore, the bearing does not suitably hold the rotary shaft because of the distortion of the bearing, so that runout of the rotary shaft easily occurs while the rotary shaft rotates. This may cause a problem that the electric compressor is noisier.

The present disclosure has been made in view of the above-described conventional circumstances, and is directed to providing an electric compressor that has great durability and quietness while the electric compressor is downsized.

SUMMARY

In accordance with an aspect of the present disclosure, there is provided an electric compressor that includes a housing, a rotary shaft rotatably supported in the housing, a motor configured to rotate the rotary shaft, and a compression part configured to compress fluid by the rotation of the rotary shaft. The housing includes a boss formed in a tubular shape protruding toward the motor in an axial direction of the rotary shaft, and the boss has an inner peripheral surface in which a bearing that supports the rotary shaft is provided. The boss has an asymmetrical shape and has an outer peripheral surface that varies in distance from the inner peripheral surface in a radial direction of the rotary shaft. The rotary shaft is press-fitted in the bearing, and the bearing is fitted in the inner peripheral surface with a clearance between the bearing and the inner peripheral surface.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe a first embodiment and a second embodiment according to the present disclosure with reference to the drawings. Specifically, electric compressors of the first embodiment and the second embodiment (hereinafter, simply referred to as compressors) are scroll type electric compressors. These compressors are each mounted on a vehicle, which is not illustrated, and serves as a part of a refrigerant circuit of the vehicle.

First Embodiment

Figure 1:
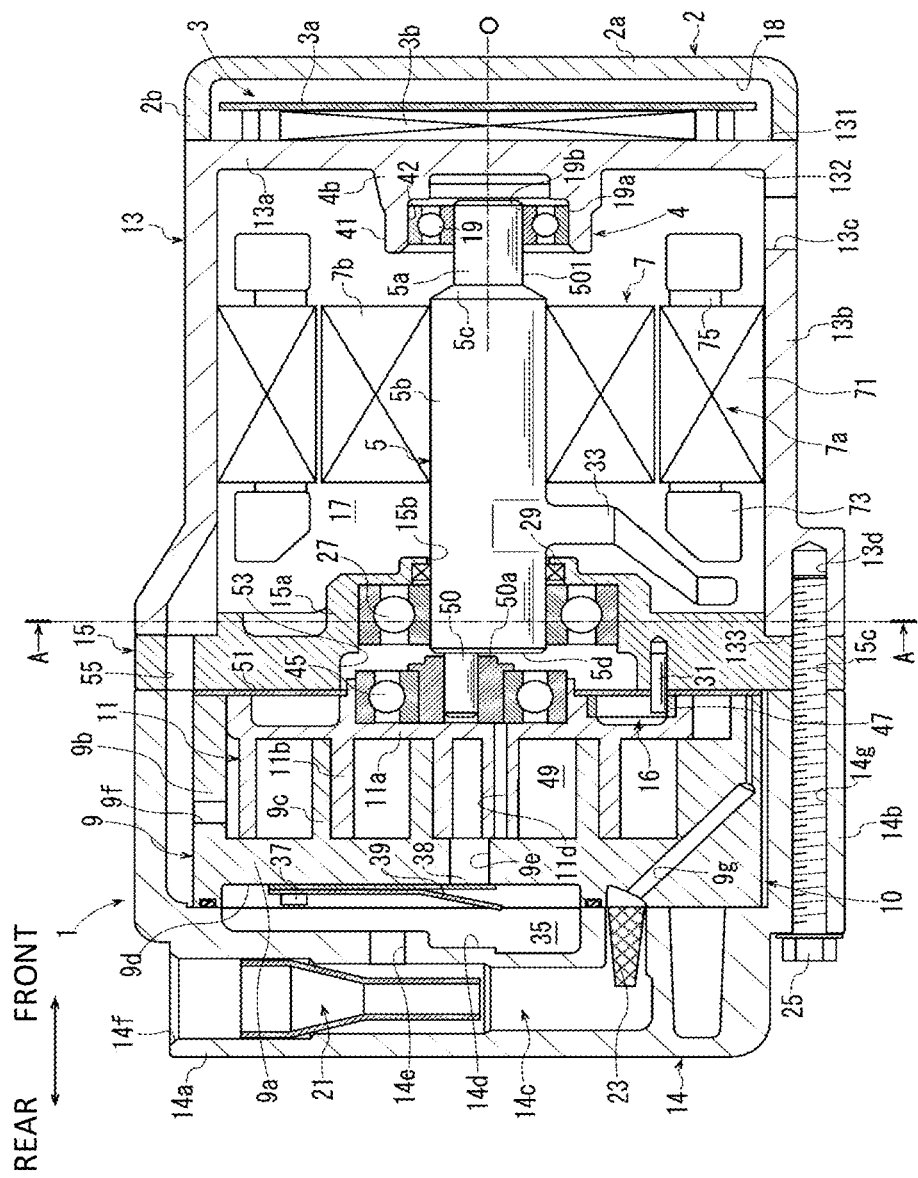
FIG. 1 is a cross-sectional view according to an electric compressor of a first embodiment.

As illustrated in FIG. 1, the compressor of the first embodiment includes a housing 1, an inverter 3, a rotary shaft 5, a motor 7, and a compression part 10.

Figure 3:
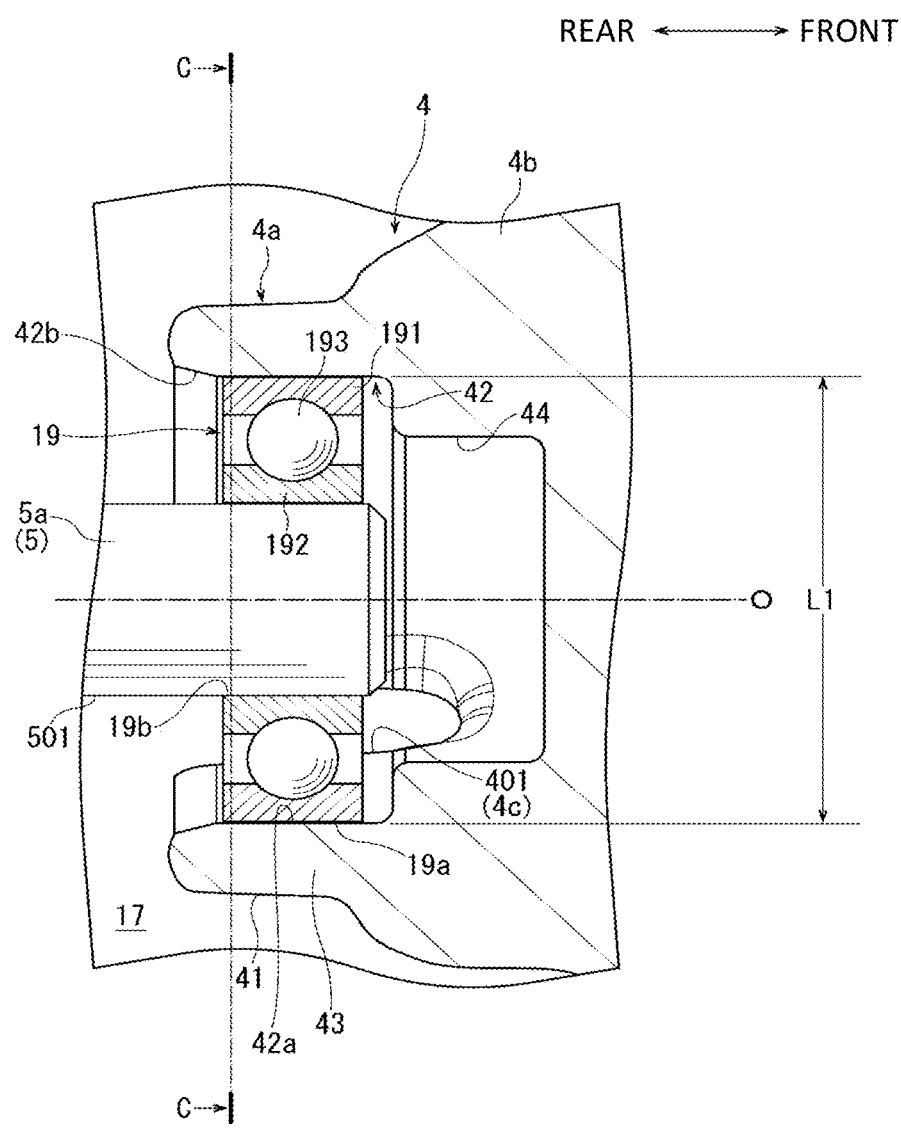
FIG. 3 is a cross-sectional view taken along a line B-B in FIG. 2, which illustrates a state in which a rotary shaft is supported by a bearing accommodated in a boss while the bearing is held by the boss, according to the electric compressor of the first embodiment.

In the present embodiment, a front-rear direction of the compressor is defined by a double headed solid arrow illustrated in FIG. 1. In FIG. 3 and the subsequent drawings, the front-rear direction of the compressor is defined in correspondence with FIG. 1. Note that this front-rear direction is an example for ease of explanation, and a posture of the compressor is changed as appropriate in correspondence with a vehicle on which the compressor is mounted, or the like.

As illustrated in FIG. 1, the housing 1 includes a motor housing 13, a compressor housing 14, a fixed block 15, and an inverter cover 2. The motor housing 13, the compressor housing 14, the fixed block 15, and the inverter cover 2 are all made of aluminum alloy. The inverter cover 2 corresponds to a front portion of the housing 1, and the compressor housing 14 corresponds to a rear portion of the housing 1.

The motor housing 13 has a first front wall 13a and a first peripheral wall 13b. The first front wall 13a is an example of the "separation wall" in the present disclosure. The first front wall 13a is located at a front end of the motor housing 13 and extends in a radial direction of the rotary shaft 5 and, by extension, in a radial direction of the motor housing 13. The first peripheral wall 13b is connected to the first front wall 13a and extends from the first front wall 13a rearward in a direction in which a rotating axis O extends. The direction in which the rotating axis O extends is parallel to the front-rear direction of the compressor.

The motor housing 13 having the first front wall 13a and the first peripheral wall 13b is formed in a bottomed tubular shape that is open at a rear end of the motor housing 13. The first front wall 13a and the first peripheral wall 13b form a motor chamber 17 in the motor housing 13.

The first front wall 13a has a front surface 131 and a rear surface 132. The front surface 131 is oriented toward a front of the motor housing 13. The rear surface 132 is located opposite to the front surface 131 across the first front wall 13a and oriented toward the motor chamber 17.

Figure 2:
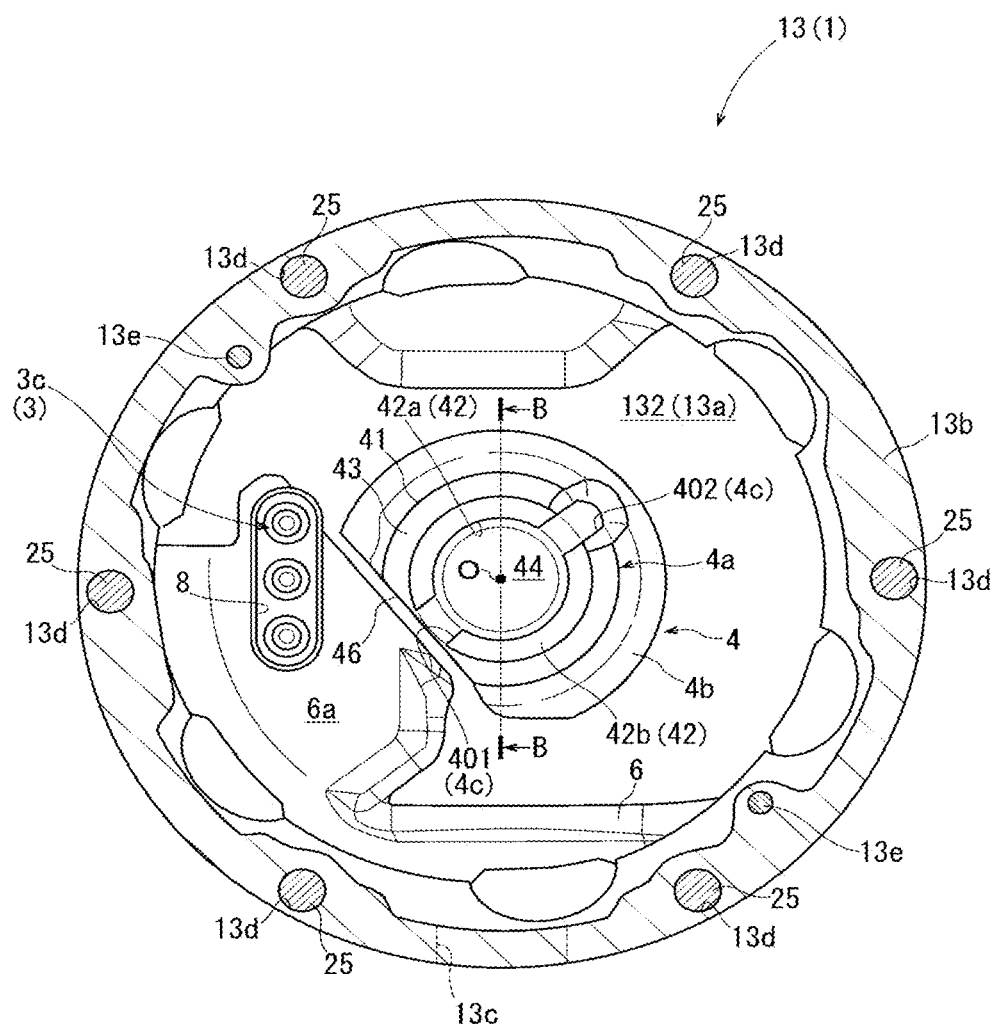
FIG. 2 is a cross-sectional view taken along a line A-A in FIG. 1, according to the electric compressor of the first embodiment.

In addition, as illustrated in FIG. 2, a first boss 4, a protruding portion 6, and a through hole 8 are formed in the first front wall 13a. The first boss 4 is an example of the "boss" in the present disclosure. Note that illustrations of the rotary shaft 5, the motor 7, and a first radial ball bearing 19, which will be described later, are omitted in FIG. 2 for the ease of explanation. The same goes for FIG. 6.

As illustrated in FIG. 2, the first boss 4 is integrally formed with the first front wall 13a. As illustrated in FIGS. 1 and 3, the first boss 4 protrudes from the rear surface 132 toward the motor 7 in the direction in which the rotating axis O extends. That is, the first boss 4 protrudes rearward from the rear surface 132 into the motor chamber 17. The first boss 4 is formed in a substantially cylindrical shape extending around the rotating axis O. A first radial ball bearing 19 is held by the first boss 4. The first radial ball bearing 19 is an example of the "bearing" in the present disclosure. These configurations of the first boss 4 and the first radial ball bearing 19 will be described later in detail.

As illustrated in FIG. 2, the protruding portion 6 is located outside the first boss 4 and close to the first boss 4. The protruding portion 6 protrudes from the rear surface 132 into the motor chamber 17. The protruding portion 6 has, at a rear end thereof, a rear end surface 6a. A part of the rear end surface 6a is formed flat. The through hole 8 is an elongated hole extending through the first front wall 13a in the direction in which the rotating axis O extends and disposed so as to overlap the protruding portion 6. That is, the through hole 8 extends from the front surface 131 of the first front wall 13a to the rear end surface 6a of the protruding portion 6. Thus, an outside of the motor housing 13 is connected to the motor chamber 17 through the through hole 8.

As illustrated in FIG. 1, the first peripheral wall 13b of the motor housing 13 has a suction opening 13c. The suction opening 13c extends in the radial direction of the motor housing 13 through the first peripheral wall 13b, and an evaporator is connected to the motor chamber 17 through a tube and the suction opening 13c. Here, illustrations of the evaporator and the tube are omitted. Refrigerant gas flowing through the evaporator is sucked into the motor chamber 17 through the tube and the suction opening 13c. The refrigerant gas is an example of the "fluid" in the present disclosure.

Furthermore, as illustrated in FIG. 2, six first bolt holes 13d are formed in a rear portion of the first peripheral wall 13b, and two positioning pins 13e are fixed to the rear portion of the first peripheral wall 13b. The first bolt holes 13d extend forward from a rear end surface 133 of the first peripheral wall 13b (see FIG. 1). The positioning pins 13e illustrated in FIG. 2 are fixed to the first peripheral wall 13b with a portion of each of the positioning pins 13e protruding rearward from the rear end surface 133.

As illustrated in FIG. 1, the compressor housing 14 has a rear wall 14a and a second peripheral wall 14b. The rear wall 14a is located at a rear end of the compressor housing 14 and extends in a radial direction of the compressor housing 14. The second peripheral wall 14b is connected to the rear wall 14a and extends forward from the rear wall 14a. The compressor housing 14 having the rear wall 14a and the second peripheral wall 14b is formed in a bottomed tubular shape that is open at a front end of the compressor housing 14.

An oil separation chamber 14c, a first discharge recess 14d, a discharge passage 14e, a discharge opening 14f, and six second bolt holes 14g are formed in the compressor housing 14. The oil separation chamber 14c is located at a rear portion of the compressor housing 14 and extends in the radial direction of the compressor housing 14. The first discharge recess 14d is located in front of the oil separation chamber 14c in the compressor housing 14, and recessed toward the oil separation chamber 14c. The discharge passage 14e extends in the front-rear direction of the compressor, and the oil separation chamber 14c communicates with the first discharge recess 14d through the discharge passage 14e. The discharge opening 14f is open toward an outside of the compressor housing 14 and the outside of the compressor housing 14 communicates with the oil separation chamber 14c through the discharge opening 14f. The discharge opening 14f is connected to a condenser through a tube. Here, illustrations of the condenser and the tube are omitted. The second bolt holes 14g are formed in the second peripheral wall 14b and extend through the second peripheral wall 14b in the front-rear direction of the compressor. Note that one of the six second bolt holes 14g is illustrated in FIG. 1.

An oil separation cylinder 21 is fixed in the oil separation chamber 14c. A separator is formed of an inner peripheral surface of the oil separation chamber 14c and an outer peripheral surface of the oil separation cylinder 21. In addition, a filter 23 is provided under the oil separation cylinder 21 in the oil separation chamber 14c.

The fixed block 15 is provided between the motor housing 13 and the compressor housing 14. The fixed block 15 has a second boss 15a protruding forward. An insertion hole 15b is formed at an end of the second boss 15a. A second radial ball bearing 27 and a sealing member 29 are provided in the second boss 15a. Furthermore, six third bolt holes 15c are formed in the fixed block 15. The third bolt holes 15c are arranged outside the second boss 15a and extend through the fixed block 15 in the front-rear direction of the compressor. Although not illustrated, the fixed block 15 has positioning recesses in correspondence with the positioning pins 13e of the motor housing 13. Note that one of the six third bolt holes 15c is illustrated in FIG. 1.

The first bolt holes 13d of the motor housing 13, the second bolt holes 14g of the compressor housing 14, and the third bolt holes 15c of the fixed block 15 are each aligned in the front-rear direction of the compressor. Furthermore, the positioning pins 13e of the motor housing 13 are inserted into the positioning recesses of the fixed block 15. The motor housing 13, the compressor housing 14, and the fixed block 15 are positioned relative to each other in this way. The motor housing 13, the compressor housing 14, and the fixed block 15 are fixed to each other by six bolts 25 inserted through the second bolt holes 14g, the third bolt holes 15c, and the first bolt holes 13d in this order from a side of the compressor housing 14. Thus, the motor housing 13, the compressor housing 14, and the fixed block 15 are integrated with each other. Note that a method of fixing the motor housing 13, the compressor housing 14, and the fixing block 15 to each other may be designed as appropriate. Furthermore, the number of the first bolt holes 13d, the number of the second bolt holes 14g, and the number of the third bolt holes 15c may be designed as appropriate in correspondence with the number of bolts 25.

When the motor housing 13, the compressor housing 14, and the fixed block 15 are fixed to each other in such a way, as illustrated in FIG. 1, the fixed block 15 is located between the motor chamber 17 and the compression part 10 in the front-rear direction of the compressor. Here, the second boss 15a protrudes forward toward the motor chamber 17.

Not only does the fixed block 15 have a plurality of suction passages 55, but also a plurality of anti-rotation pins 31 is fixed to the fixed block 15. The suction passages 55 are arranged outside the second boss 15a and inside the third bolt holes 15c, and extend through the fixed block 15 in the front-rear direction of the compressor. Thus, the motor chamber 17 communicates with an inside of the compressor housing 14 through the suction passages 55. The anti-rotation pins 31 are fixed to the fixed block 15 while protruding rearward into the fixed block 15. Note that one of the suction passages 55 and one of the anti-rotation pins 31 are illustrated in FIG. 1.

The inverter cover 2 is disposed in front of the motor housing 13. The inverter cover 2 has a second front wall 2a and a third peripheral wall 2b. The second front wall 2a is located at a front end of the inverter cover 2 and extends in a radial direction of the inverter cover 2. The third peripheral wall 2b is connected to the second front wall 2a and extends rearward from the second front wall 2a. The inverter cover 2 having the second front wall 2a and the third peripheral wall 2b is formed in a bottomed tubular shape that is open at a rear end of the inverter cover 2. Note that the inverter cover 2 may be made of resin.

A rear end of the third peripheral wall 2b of the inverter cover 2 is in contact with the front surface 131 of the first front wall 13a of the motor housing 13. In this state, the inverter cover 2 is fixed to the motor housing 13 with a plurality of bolts, which is not illustrated. Thus, the inverter cover 2, the motor housing 13, the fixed block 15, and the compressor housing 14 are fixed in this order rearward, and constitute the housing 1. The inverter cover 2 cooperates with the first front wall 13a to form an inverter chamber 18 therebetween. That is, the motor chamber 17 is separated from the inverter chamber 18 by the first front wall 13a. The inverter chamber 18 communicates with the through hole 8 as illustrated in FIG. 2. Although not illustrated, a connector portion is formed in the second front wall 2a of the inverter cover 2.

The inverter 3 as illustrated in FIG. 1 is accommodated in the inverter chamber 18. The inverter 3 includes a circuit board 3a, a switching element 3b, hermetical sealed terminals 3c illustrated in FIG. 2, and the like. The circuit board 3a is fixed to the front surface 131 of the first front wall 13a of the motor housing 13 by bolts, which are not illustrated. The circuit board 3a is connected to a battery provided in the vehicle through the connector portion. Here, an illustration of the battery is omitted. The switching element 3b is provided on the circuit board 3a. Since the circuit board 3a is fixed to the front surface 131, the switching element 3b faces the front surface 131 and comes into contact with the front surface 131. With this contact, heat generated from the switching element 3b during operation of the compressor is radiated to the first front wall 13a. Note that the switching element 3b may be away from the first front wall 13a.

The hermetical sealed terminals 3c illustrated in FIG. 2 are connected to the circuit board 3a. In addition, the hermetical sealed terminals 3c are disposed in the through hole 8 and fixed to the first front wall 13a of the motor housing 13 by bolts, which are not illustrated. Thus, while the hermetical sealed terminals 3c are inserted in the through hole 8, the hermetical sealed terminals 3c faces the motor chamber 17 in the through hole 8. The hermetical sealed terminals 3c provide a seal between the inverter chamber 18 and the motor chamber 17. Note that a shape of each of the hermetical sealed terminals 3c may be designed as appropriate. A shape of the through hole 8 also may be designed as appropriate in correspondence with the shapes of the hermetical sealed terminals 3c.

As illustrated in FIG. 1, the rotary shaft 5 is provided in the housing 1. The rotary shaft 5 is made of steel and formed in a columnar shape extending in the front-rear direction of the compressor. The rotary shaft 5 has a small diameter portion 5a, a large diameter portion 5b, and a taper portion 5c. Although the detailed illustration is omitted, the rotary shaft 5 is formed by cutting machining. Thus, the small diameter portion 5a, the large diameter portion 5b, and the taper portion 5c each have a cross section of a substantially perfect circle, which is perpendicular to the rotary shaft 5. The rotary shaft 5 also has an outer peripheral surface 501. The outer peripheral surface 501 is formed of an outer peripheral surface of the small diameter portion 5a, an outer peripheral surface of the large diameter portion 5b, and an outer peripheral surface of the taper portion 5c.

The small diameter portion 5a is located near a front end of the rotary shaft 5. The large diameter portion 5b is located behind the small diameter portion 5a, and a diameter of the large diameter portion 5b is larger than that of the small diameter portion 5a. A rear end surface 5d is formed flat and located at a rear end of the large diameter portion 5b. The taper portion 5c is located between the small diameter portion 5a and the large diameter portion 5b. A front end of the taper portion 5c is connected to the small diameter portion 5a. The taper portion 5c increases in diameter as the taper portion 5c extends rearward, and a rear end of the taper portion 5c is connected to the large diameter portion 5b.

The small diameter portion 5a of the rotary shaft 5 is rotatably supported by the first boss 4 of the motor housing 13 through the first radial ball bearing 19. A rear end portion of the large diameter portion 5b is inserted in the insertion hole 15b of the fixed block 15 and enters the second boss 15a. In the second boss 15a, the rear end portion of the large diameter portion 5b is rotatably supported by the second radial ball bearing 27. Thus, the rotary shaft 5 is rotatable around the rotating axis O in the housing 1. The sealing member 29 provides a seal between the fixed block 15 and the rotary shaft 5.

In the rotary shaft 5, an eccentric pin 50 is fixed to the large diameter portion 5b. The eccentric pin 50 is disposed at a position eccentric to the rotating axis O in the rear end surface 5d. The eccentric pin 50 is formed in a columnar shape with a diameter smaller than that of the rotary shaft 5, and extends rearward from the rear end surface 5d. When the rear end portion of the large diameter portion 5b is inserted into the insertion hole 15b, the eccentric pin 50 enters the second boss 15a. The eccentric pin 50 is engaged with a bush 50a in the second boss 15a.

In the rotary shaft 5, a balance weight 33 is formed integrally with the large diameter portion 5b. The balance weight 33 is disposed at a position eccentric to the rotating axis O in the large diameter portion 5b. More specifically, the balance weight 33 is disposed at a position distant from the eccentric pin 50 across the rotating axis O.

Although the detailed illustration is omitted, the balance weight 33 is formed in a substantially fan-shaped plate shape. The balance weight 33 extends in the radial direction of the rotary shaft 5 so as to be away from the large diameter portion 5b. The radial direction of the rotary shaft 5 is a direction perpendicular to the rotating axis O. That is, the balance weight 33 extends from the large diameter portion 5b toward the first peripheral wall 13b of the motor housing 13. When the rotary shaft 5 is disposed in the housing 1, the balance weight 33 is located in the motor chamber 17. More specifically, the balance weight 33 is located between the fixed block 15 and the motor 7 in the motor chamber 17. Note that a shape of the balance weight 33 may be designed as appropriate.

The motor 7 is accommodated in the motor chamber 17. Here, the motor 7 is accommodated in front of the balance weight 33 in the motor chamber 17. The motor 7 includes a stator 7a and a rotor 7b.

Figure 6:
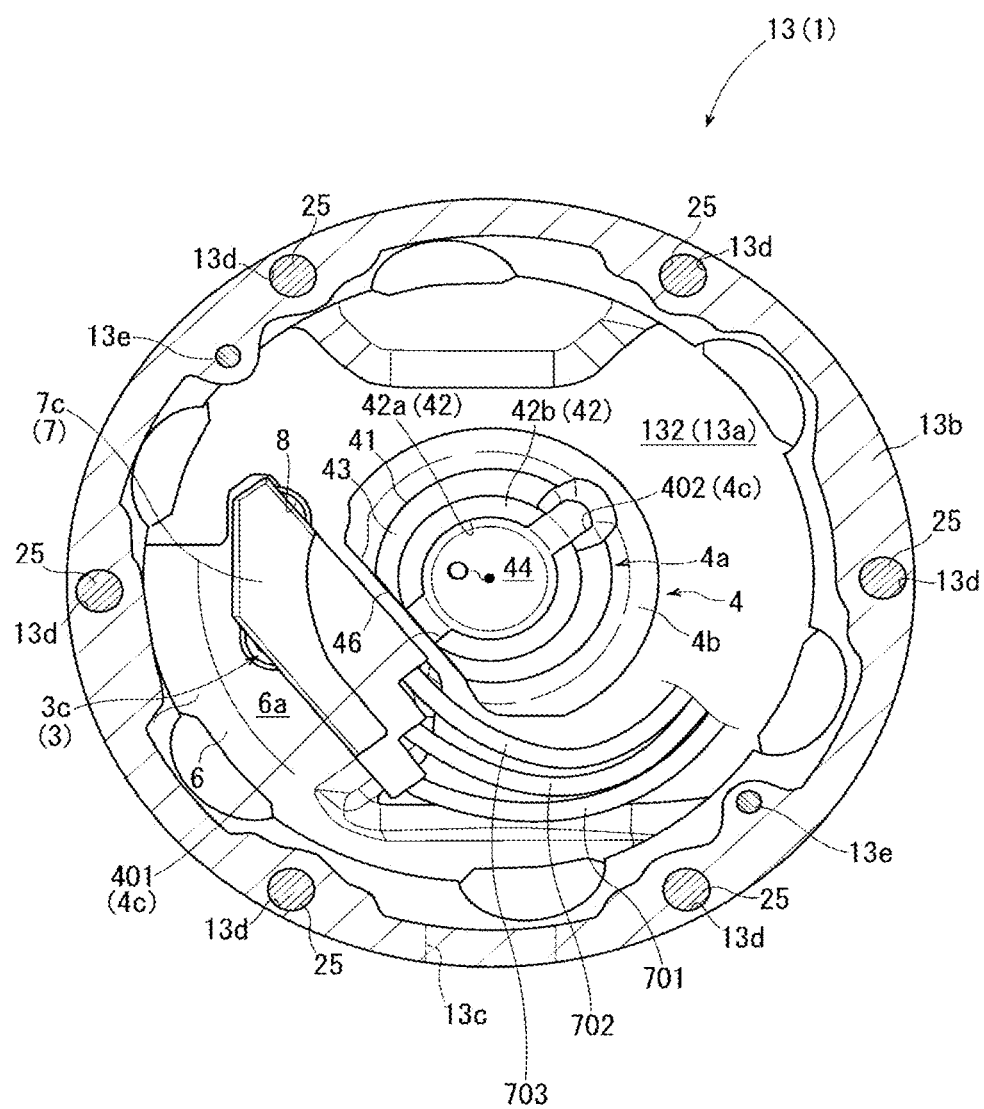
FIG. 6 is a cross-sectional view similar to FIG. 2, which illustrates a state in which an inverter is connected to a motor through a cluster block, according to the electric compressor of the first embodiment.

The stator 7a has a stator core 71. The stator core 71 is formed in a cylindrical shape and fixed to an inner peripheral surface of the first peripheral wall 13b. A coil 75 is wound around the stator core 71. The coil 75 has a cluster block 7c, a first lead wire 701, a second lead wire 702, and a third lead wire 703 as illustrated in FIG. 6 in addition to coil ends 73. The cluster block 7c is an example of the "terminal box" in the present disclosure. Each of the first to third lead wires 701 to 703 is an example of the "lead wire" in the present disclosure.

As illustrated in FIG. 1, the coil ends 73 of the coil 75 protrude from opposite ends of the stator core 71 in the front-rear direction of the compressor and are each formed in a ring shape. An inner peripheral portion of the coil end 73 at a rear end of the coil 75 is inclined so as to avoid interference with the balance weight 33. Note that illustrations of the cluster block 7c and the first to third lead wires 701 to 703 are omitted for ease of explanation in FIG. 1.

Connecter terminals, which are not illustrated, are accommodated in the cluster block 7c illustrated in FIG. 6. Although detailed illustrations are omitted, the first to third lead wires 701 to 703 extend from the coil end 73 at a front end of the coil 75 to the cluster block 7c. The cluster block 7c is connected to the coil end 73 at the front end of the coil 75 through the first to third lead wires 701 to 703. Furthermore, the cluster block 7c is located behind the protruding portion 6 while facing the rear end surface 6a of the protruding portion 6, and is connected to the hermetical sealed terminals 3c. Thus, the stator 7a is electrically connected to the inverter 3 through the cluster block 7c. Here, a part of the rear end surface 6a of the protruding portion 6 supports the cluster block 7c while being in contact with the cluster block 7c.

As illustrated in FIG. 1, the rotor 7b is disposed inside the stator 7a. The large diameter portion 5b of the rotary shaft 5 is fixed to the rotor 7b. The rotor 7b rotates inside the stator 7a, which rotates the rotary shaft 5 around the rotating axis O.

The compression part 10 is specifically a scroll type compression mechanism, and includes a fixed scroll 9 and a movable scroll 11. The fixed scroll 9 is fixed to the compressor housing 14 and disposed in the compressor housing 14. The fixed scroll 9 has a fixed scroll end plate 9a, a fixed scroll peripheral wall 9b, and a fixed scroll spiral wall 9c.

The fixed scroll end plate 9a is located at a rear end of the fixed scroll 9 and formed in a disc shape. A second discharge recess 9d and a discharge port 9e are formed in the fixed scroll end plate 9a. The second discharge recess 9d is recessed from a rear end surface of the fixed scroll end plate 9a in a front direction of the compressor. When the fixed scroll 9 is fixed to the compressor housing 14, the second discharge recess 9d faces the first discharge recess 14d. Thus, the first discharge recess 14d cooperates with the second discharge recess 9d to form a discharge chamber 35. The discharge chamber 35 communicates with the oil separation chamber 14c through the discharge passage 14e. The discharge port 9e extends to the discharge chamber 35 through the fixed scroll end plate 9a in the front-rear direction of the compressor.

A discharge reed valve 38 and a retainer 39 are fixed to the fixed scroll end plate 9a by a bolt 37. The bolt 37, the discharge reed valve 38, and the retainer 39 are disposed in the discharge chamber 35. The discharge reed valve 38 is elastically deformed to open and close the discharge port 9e. The retainer 39 adjusts an amount of the elastic deformation of the discharge reed valve 38.

The fixed scroll peripheral wall 9b is connected to an outer peripheral portion of the fixed scroll end plate 9a, and is formed in a tubular shape extending forward. A suction port 9f is formed in the fixed scroll peripheral wall 9b. The suction port 9f extends through the fixed scroll peripheral wall 9b in a radial direction of the fixed scroll 9. Thus, the suction port 9f is open to the inside of the compressor housing 14. The fixed scroll spiral wall 9c is provided upright from a front surface of the fixed scroll end plate 9a, and is formed integrally with the fixed scroll peripheral wall 9b inside the fixed scroll peripheral wall 9b.

An oil supply passage 9g is also formed in the fixed scroll 9. The oil supply passage 9g extends through the fixed scroll end plate 9a and the fixed scroll peripheral wall 9b. With this configuration, the oil supply passage 9g, at a rear end thereof, is open in the rear end surface of the fixed scroll end plate 9a, and the oil supply passage 9g, at a front end thereof, is open in a front end surface of the fixed scroll peripheral wall 9b. The oil supply passage 9g communicates with the oil separation chamber 14c through the filter 23. Note that a shape of the oil supply passage 9g may be designed as appropriate.

The movable scroll 11 is disposed in the compressor housing 14 and located between the fixed scroll 9 and the fixed block 15. The movable scroll 11 has a movable scroll end plate 11a and a movable scroll spiral wall 11b. The movable scroll end plate 11a is located at a front end of the movable scroll 11 and formed in a disc shape. The bush 50a is rotatably supported by the movable scroll end plate 11a through a third radial ball bearing 45. Thus, the movable scroll 11 is connected to the rotary shaft 5 at a position eccentric to the rotating axis O through the bush 50a and the eccentric pin 50. The movable scroll spiral wall 11b is provided upright from a front surface of the movable scroll end plate 11a and extends toward the fixed scroll end plate 9a.

Rings 47 of the same number as the anti-rotation pins 31 are provided in the movable scroll end plate 11a. A supply hole 11d is open at a rear end of the movable scroll spiral wall 11b and located near a center of the movable scroll spiral wall 11b. The supply hole 11d extends through the movable scroll spiral wall 11b and also through the movable scroll end plate 11a in the front-rear direction of the compressor.

The fixed scroll 9 and the movable scroll 11 are engaged with each other. With this engagement, the fixed scroll end plate 9a, the fixed scroll spiral wall 9c, the movable scroll end plate 11a, and the movable scroll spiral wall 11b form a compression chamber 49 between the fixed scroll 9 and the movable scroll 11. The compression chamber 49 changes its volume as the movable scroll 11 rotates. This causes the compression chamber 49 to communicate with the suction port 9f and the discharge port 9e.

Each of the rings 47 is coupled to a corresponding one of the anti-rotation pins 31 by entering the anti-rotation pin 31 into the ring 47. The anti-rotation pins 31 and the rings 47 form an anti-rotation mechanism 16. In the anti-rotation mechanism 16, each of the anti-rotation pins 31 rolls while sliding on an inner peripheral surface of the corresponding one of the rings 47, so that the rotation of the movable scroll 11 is regulated and the movable scroll 11 only orbits. In the anti-rotation pins 31 and the rings 47 that form the anti-rotation mechanism 16, the number of the anti-rotation pins 31 and the number of the rings 47 may be designed as appropriate as long as each number is three or more.

A thrust plate 51 is provided between the movable scroll 11 and the fixed block 15. The thrust plate 51 is made of a thin metal plate, and is in contact with the movable scroll 11 and the fixed block 15 on opposite sides of the thrust plate 51. The thrust plate 51 may urge the movable scroll 11 rearward, that is, toward the fixed scroll 9 by a restoring force during elastic deformation. The movable scroll end plate 11a cooperates with the thrust plate 51 to form a back pressure chamber 53 in the second boss 15a of the fixed block 15. The back pressure chamber 53 communicates with the supply hole 11d.

Figure 4:
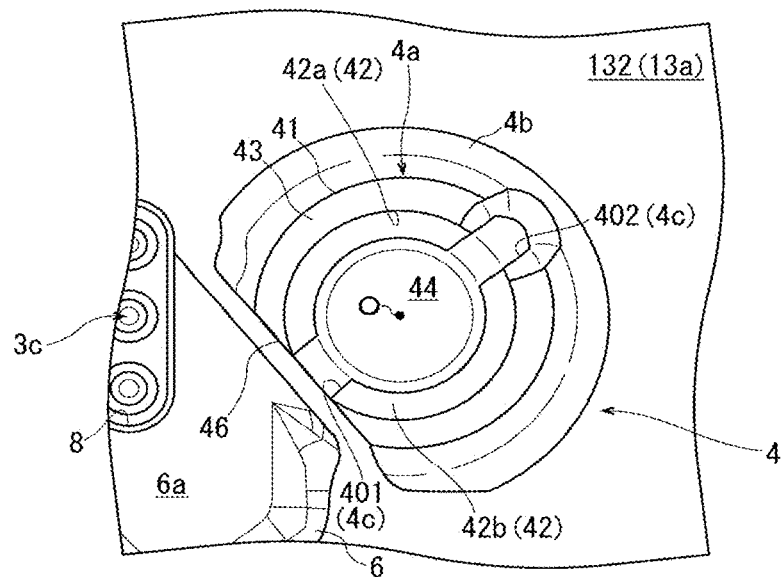
FIG. 4 is an enlarged view of a main part of FIG. 2, which illustrates the boss, according to the electric compressor of the first embodiment.

As illustrated in FIGS. 2 to 4, the first boss 4 has a boss main body 4a, a connecting portion 4b, and a supply passage 4c. Here, since the motor housing 13 is made of aluminum alloy, the first boss 4 integrally formed with the first front wall 13a of the motor housing 13 is also made of aluminum alloy.

As illustrated in FIG. 3, the boss main body 4a corresponds to a rear portion of the first boss 4. The boss main body 4a is formed in a substantially cylindrical shape extending around the rotating axis O and has a first outer peripheral surface 41, a first inner peripheral surface 42, and a wall portion 43. The first outer peripheral surface 41 is an example of the "outer peripheral surface" in the present disclosure. The first inner peripheral surface 42 is an example of the "inner peripheral surface" in the present disclosure.

Figure 5:
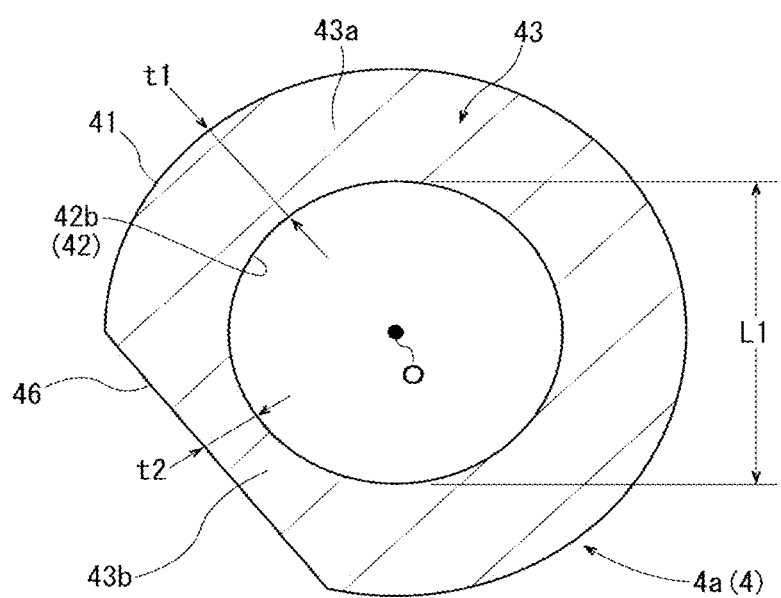
FIG. 5 is a schematic cross-sectional view taken along a line C-C in FIG. 3, according to the electric compressor of the first embodiment.

As illustrated in FIG. 5, the first outer peripheral surface 41 corresponds to an outer surface of the boss main body 4a and faces the motor chamber 17. The first inner peripheral surface 42 is located inside the first outer peripheral surface 41 in a radial direction of the boss main body 4a, that is, in the radial direction of the rotary shaft 5. Thus, the first inner peripheral surface 42 corresponds to an inner surface of the boss main body 4a.

As illustrated in FIG. 3, the first inner peripheral surface 42 has an engagement portion 42a and a guide portion 42b. An inner diameter of the engagement portion 42a is a first length L1, which is larger than an outer diameter of the first radial ball bearing 19. The engagement portion 42a holds the first radial ball bearing 19 while accommodating the first radial ball bearing 19.

The guide portion 42b is located behind the engagement portion 42a and connected to the engagement portion 42a. An inner diameter of a front end of the guide portion 42b, that is, an inner diameter of a connecting point of the guide portion 42b with the engagement portion 42a, is the same as an inner diameter of the engagement portion 42a. The guide portion 42b has a tapered shape gradually increasing in diameter such that the diameter of the guide portion 42b is larger than the diameter of the engagement portion 42a as the guide portion 42b extends from the engagement portion 42a rearward in an axial direction of the rotary shaft 5, that is, in the direction in which the rotating axis O extends. As a result, an inner diameter of a rear end of the guide portion 42b is larger than the inner diameter of the engagement portion 42a and the outer diameter of the first radial ball bearing 19.

As illustrated in FIG. 5, the wall portion 43 is located between the first outer peripheral surface 41 and the first inner peripheral surface 42 in the radial direction of the rotary shaft 5. Note that, in FIG. 5, a shape of the boss main body 4a is simplified and illustrations of the supply passage 4c, rotary shaft 5, and the first radial ball bearing 19 are omitted for ease of explanation.

As illustrated in FIG. 3, the connecting portion 4b is located in front of the boss main body 4a. That is, the connecting portion 4b corresponds to a front portion of the first boss 4. The connecting portion 4b is connected to a front end of the boss main body 4a. As illustrated in FIG. 4, the connecting portion 4b extends forward while increasing in diameter such that the diameter of the connecting portion 4b is larger than the outer diameter of the boss main body 4a, and is connected to the rear surface 132 of the first front wall 13a. In addition, as illustrated in FIG. 3, a recess 44 is formed in the connecting portion 4b. The recess 44 is recessed in a columnar shape extending around the rotating axis O. The recess 44 is connected to the engagement portion 42a. An inner diameter of the recess 44 is smaller than that of the engagement portion 42a.

Here, in this compressor, a diameter of the motor housing 13 is reduced in order to downsize the compressor. Accordingly, the protruding portion 6 and the through hole 8 in addition to the first boss 4 are formed in the first front wall 13a as described above. However, it is no longer possible to ensure a sufficient space between the first boss 4 and the protruding portion 6 and between the first boss 4 and the through hole 8. For this reason, as illustrated in FIG. 6, an interference avoidance portion 46 is formed in the first boss 4 in order to prevent the first boss 4 from interfering with the cluster block 7c when the cluster block 7c is connected to the hermetical sealed terminals 3c.

This interference avoidance portion 46 is formed in the boss main body 4a and the connecting portion 4b on a side where the protruding portion 6, the through hole 8, and the cluster block 7c are located, that is, in portions of the boss main body 4a and the connecting portion 4b near the protruding portion 6, the through hole 8, and the cluster block 7c in the radial direction of the rotary shaft 5. The interference avoidance portion 46 extends flat in the direction in which the rotating axis O extends.

The interference avoidance portion 46 is formed in the boss main body 4a and the connecting portion 4b, and thus, the boss main body 4a and the connecting portion 4b are away from the protruding portion 2, the through hole 8, and the cluster block 7c.

When the interference avoidance portion 46 is formed, the first outer peripheral surface 41 of the boss main body 4a and the connecting portion 4b have a cutout having a flat surface at a portion where the interference avoidance portion 46 is formed. The interference avoidance portion 46 is an example of the "cutout" in the present disclosure. With this cutout, as illustrated in FIGS. 4 and 5, when the boss main body 4a is viewed forward in the rotating axis O, the first outer peripheral surface 41 of the boss main body 4a is not formed in an arc shape in a circumferential direction of the boss main body 4a over an entire circumference of the first outer peripheral surface 41, and the first outer peripheral surface 41 has the straight portion where the interference avoidance portion 46 is formed. On the other hand, since the first inner peripheral surface 42 is not affected by the shape of the interference avoidance portion 46, there is no straight portion in the first inner peripheral surface 42.

As a result, as illustrated in FIG. 5, a wall thickness of the wall portion 43 in the boss main body 4a is not uniform as a whole. That is, the wall portion 43 has a first wall portion 43a whose thickness in the radial direction of the rotary shaft 5 is a first thickness t1 and a second wall portion 43b whose thickness in the radial direction of the rotary shaft 5 at the thinnest wall portion is a second thickness t2. The second thickness t2 is smaller than the first thickness t1. That is, a wall thickness of the second wall portion 43b is smaller than that of the first wall portion 43a. In other words, the second wall portion 43b thinner than the first wall portion 43a is formed in the wall portion 43, which forms the interference avoidance portion 46 in the first boss 4. Strictly speaking, the wall thickness is not constant at the second thickness t2 over the whole of the second wall portion 43b, and the wall thickness of the second wall portion 43b is also changed. However, the wall thickness of the second wall portion 43b is smaller than the first thickness t1 at any portion in the second wall portion 43b.

As the wall thickness of the second wall portion 43b decreases, a distance between the first outer peripheral surface 41 and the first inner peripheral surface 42 in the radial direction of the rotary shaft 5 becomes shorter at a portion of the boss main body 4a where the second wall portion 43b is formed, that is, where the interference avoidance portion 46 is formed, than at the portion of the boss main body 4a where the first wall portion 43a is formed. In addition, distances between the first inner peripheral surface 42 and the protruding portion 6, between the first inner peripheral surface 42 and the through hole 8, and between the first inner peripheral surface 42 and the cluster block 7c in the radial direction of the rotary shaft 5 become shorter when the interference avoidance portion 46 is formed than those when the first wall portion 43a is formed over the entire circumference of the boss main body 4a, that is, those when the interference avoidance portion 46 is not formed (see FIG. 6). As a result, as illustrated in FIGS. 4 to 6, the first boss 4 has an asymmetrical shape in which a shape on a side where the interference avoidance portion 46 is formed is different from a shape on a side where the interference avoidance portion 46 is not formed with the rotating axis O as a reference. In other words, the first boss 4 is formed in the asymmetrical shape in which a shape on a right side of papers of FIGS. 4 to 6 is different from a shape on a left side of the papers of FIGS. 4 to 6.

As illustrated in FIG. 4, the supply passage 4c extends in the radial direction of the rotary shaft 5 and is recessed from a rear end of the first boss 4 in the front direction of the compressor. That is, the supply passage 4c is recessed from the boss main body 4a to the connecting portion 4b. The guide portion 42b is cut out by the supply passage 4c. Here, the boss main body 4a and, by extension, the first boss 4 has a cylindrical shape, and thus, the supply passage 4c is formed of a first passage portion 401 located closer to the interference avoidance portion 46 than the rotating axis O in the radial direction of the rotary shaft 5 and a second passage portion 402 that is located opposite to the first passage portion 401 across the rotating axis O.

The first outer peripheral surface 41 is connected to the engagement portion 42a of the first inner peripheral surface 42 through the supply passage 4c at a portion of the boss main body 4a where the supply passage 4c is formed. Similarly, in the connecting portion 4b, the recess 44 is connected to an outer surface of the connecting portion 4b through the supply passage 4c.

The first radial ball bearing 19 is made of steel and has an outer ring 191, an inner ring 192, and a plurality of bearing balls 193 as illustrated in FIG. 3. The outer ring 191 has a second outer peripheral surface 19a that is an outer peripheral surface of the first radial ball bearing 19. The inner ring 192 is disposed inside the outer ring 191, and has a second inner peripheral surface 19b that is an inner peripheral surface of the first radial ball bearing 19. The bearing balls 193 are each formed in a spherical shape and provided between the outer ring 191 and the inner ring 192.

An outer diameter of the outer ring 191, that is, a diameter of the second outer peripheral surface 19a of the first radial ball bearing 19 is shorter than the inner diameter of the engagement portion 42a. In addition, an inner diameter of the inner ring 192, that is, a diameter of the second inner peripheral surface 19b of the first radial ball bearing 19 is shorter than an outer diameter of the small diameter portion 5a of the rotary shaft 5. This means that the outer diameter of the first radial ball bearing 19 is smaller than an inner diameter of the boss main body 4a, and the inner diameter of the first radial ball bearing 19 is smaller than the outer diameter of the small diameter portion 5a.

The first radial ball bearing 19 is assembled to the rotary shaft 5 with the small diameter portion 5a of the rotary shaft 5 inserted through the inner ring 192. Here, as described above, since the inner diameter of the first radial ball bearing 19 is smaller than the outer diameter of the small diameter portion 5a, the small diameter portion 5a is inserted into the inner ring 192 by press-fitting in this compressor. As a result, the first radial ball bearing 19 is assembled to the small diameter portion 5a. Thus, in this compressor, the small diameter portion 5a of the rotary shaft 5 is fixed to the second inner peripheral surface 19b of the first radial ball bearing 19 by the press-fitting.

The first radial ball bearing 19 assembled to the rotary shaft 5 enters the boss main body 4a in the front direction of the compressor. Here, in the boss main body 4a, the guide portion 42b guides the first radial ball bearing 19 to the engagement portion 42a. As described above, the inner diameter of the engagement portion 42a is larger than the outer diameter of the first radial ball bearing 19. Accordingly, in this compressor, when the first radial ball bearing 19 enters the engagement portion 42a, the first radial ball bearing 19 need not be press-fitted into the engagement portion 42a.

With this configuration, in this compressor, the second outer peripheral surface 19a of the first radial ball bearing 19 is fitted into the engagement portion 42a with a clearance between the second outer peripheral surface 19a and the engagement portion 42a. Thus, the first boss 4 holds the first radial ball bearing 19 in a state where the first radial ball bearing 19 is accommodated in the engagement portion 42a. The first radial ball bearing 19 rotatably supports the rotary shaft 5 while being held by the first boss 4.

In the compressor having the above-described configuration, refrigerant gas at low pressure and low temperature flowing through the evaporator is sucked into the motor chamber 17 through the suction opening 13c. That is, the motor chamber 17 also serves as a suction chamber in this compressor. Note that the refrigerant gas sucked into the motor chamber 17 contains lubricant oil, which is not illustrated.

The inverter 3 converts DC current supplied from the battery to AC current by the switching element 3b and supplies the AC power to the stator 7a. In this way, the inverter 3 controls an operation of the motor 7. This rotates the rotor 7b around the rotating axis O together with the rotary shaft 5 in the motor chamber 17.

As a result, in the compression part 10, when the movable scroll 11 rotates, the movable scroll end plate 11a slides on a tip of the fixed scroll spiral wall 9c, and the fixed scroll spiral wall 9c and the movable scroll spiral wall 11b slide on each other. Here, the movable scroll 11 is prevented from rotating by the anti-rotation mechanism 16 and only orbits. As the movable scroll 11 rotates in this way, the refrigerant gas in the motor chamber 17 flows to the suction port 9f through the suction passages 55 and is sucked into the compression chamber 49 from the suction port 9f. The volume of the compression chamber 49 is decreased by the rotation of the movable scroll 11, which compresses the refrigerant gas in the compression chamber 49.

The refrigerant gas at high pressure compressed in the compression chamber 49 is discharged to the discharge chamber 35 through the discharge port 9e, and then, flows from the discharge chamber 35 to the oil separation chamber 14c through the discharge passage 14e. The lubricant oil is separated from this refrigerant gas at high pressure while the refrigerant gas goes back and forth between the outer peripheral surface of the oil separation cylinder 21 and the inner peripheral surface of the oil separation chamber 14c. In this state, the refrigerant gas flows through the oil separation cylinder 21 and is discharged from the discharge opening 14f.

On the other hand, the lubricant oil separated from the refrigerant gas is stored in the oil separation chamber 14c. Then, this lubricant oil flows through the filter 23 and the oil supply passage 9g and is supplied to the sliding portion between the fixed scroll 9 and the movable scroll 11, so that the sliding portion therebetween is lubricated by the lubricant oil. Furthermore, the lubricant oil flowing through the oil supply passage 9g is supplied not only between the second radial ball bearing 27 and the rotary shaft 5 but also into the motor chamber 17.

A part of the lubricant oil in the motor chamber 17 is supplied to the first radial ball bearing 19 and between the first radial ball bearing 19 and the small diameter portion 5a of the rotary shaft 5 through the supply passage 4c of the first boss 4. Thus, the first radial ball bearing 19 and the rotary shaft 5 are lubricated.

A part of the refrigerant gas at high pressure compressed in the compression chamber 49 flows through the supply hole 11d and is supplied to the back pressure chamber 53. This increases pressure in the back pressure chamber 53. As a result, the movable scroll 11 is urged toward the compression chamber 49 by the pressure in the back pressure chamber 53 via the thrust plate 51. The movable scroll 11 is also urged toward the compression chamber 49 by an elastic force of the thrust plate 51. Accordingly, in this compressor, the movable scroll 11 is prevented from rotating in a state where the movable scroll 11 is inclined relative to the rotating axis O.

In this compressor, the diameter of the motor housing 13 is reduced to downsize the compressor. This allows greater ease of mounting the compressor to a vehicle. Here, as the diameter of the motor housing 13 is reduced in this way, the distances between the first boss 4 and the protruding portion 6, between the first boss 4 and the through hole 8 and, by extension, the distance between the first boss 4 and the cluster block 7c become shorter, which is inevitable. In this regard, in this compressor, since the interference avoidance portion 46 is formed in the first boss 4, the first boss 4 hardly interferes with the cluster block 7c. With this configuration, the cluster block 7c is easily connected to the hermetical sealed terminals 3c. In this compressor, it is also prevented that connection failure between the cluster block 7c and the hermetical sealed terminals 3c is caused by the interference of the first boss 4 with the cluster block 7c.

On the other hand, since the interference avoidance portion 46 is formed in the first boss 4, the wall thickness of the wall portion 43 is not uniform in the boss main body 4a of the first boss 4. That is, the wall portion 43 has the first wall portion 43a and the second wall portion 43b, and the wall thickness of the second wall portion 43b is smaller than that of the first wall portion 43a. Accordingly, the distance between the first outer peripheral surface 41 and the first inner peripheral surface 42 in the radial direction of the rotary shaft 5 becomes shorter at the portion of the boss main body 4a where the second wall portion 43b is formed, that is, the portion of the boss main body 4a where the interference avoidance portion 46 is formed and, by extension, the distances between the first inner peripheral surface 42 and the protruding portion 6, between the first inner peripheral surface 42 and the through hole 8, and between the first inner peripheral surface 42 and the cluster block 7c in the radial direction of the rotary shaft 5 become shorter when the interference avoidance portion 46 is formed than those when the first wall portion 43a is formed over the entire circumference of the boss main body 4a, that is, those when the interference avoidance portion 46 is not formed. Thus, the first boss 4 has the asymmetrical shape.

When the first radial ball bearing 19 is held by the engagement portion 42a of the first boss 4, it may be considered that the engagement portion 42a is formed such that the inner diameter of the engagement portion 42a is smaller than the outer diameter of the first radial ball bearing 19, and the first radial ball bearing 19 is press-fitted into the engagement portion 42a. However, when the wall portion 43 has the first wall portion 43a and the second wall portion 43b and the wall thickness of the wall portion 43 is not uniform as a whole, various deformation of the first inner peripheral surface 42 including the engagement portion 42a easily occurs during the press-fitting. Accordingly, in the boss main body 4a, the engagement portion 42a is easily distorted. The first radial ball bearing 19 is also easily distorted because of the distortion of the engagement portion 42a. In addition, while the first boss 4 is made of aluminum alloy, the first radial ball bearing 19 is made of steel, and thus, a thermal expansion coefficient of the first boss 4 is different from a thermal expansion coefficient of the first radial ball bearing 19. These characteristics also cause the first radial ball bearing 19 to be easily distorted because of the distortion of the engagement portion 42a. As roundness of the second outer peripheral surface 19a and the second inner peripheral surface 19b of the first radial ball bearing 19 decreases for these reasons, durability of the first radial ball bearing 19 decreases, so that there is a concern that the first radial ball bearing 19 may not suitably support the rotary shaft 5.

In this regard, in this compressor, the second outer peripheral surface 19a of the first radial ball bearing 19 is fitted into the engagement portion 42a of the boss main body 4a with the clearance between the second outer peripheral surface 19a and the engagement portion 42a. With this configuration, in this compressor, even when the first boss 4 has the asymmetrical shape and the wall thickness of the wall portion 43 of the boss main body 4a is not uniform, there is no problem in holding the first radial ball bearing 19 by the first boss 4. That is, in this compressor, when the first radial ball bearing 19 is held by the engagement portion 42a, the first radial ball bearing 19 is hardly distorted. As a result, the durability of the first radial ball bearing 19 and, by extension, durability of the compressor is increased.

In this compressor, the small diameter portion 5a of the rotary shaft 5 is press-fitted and fixed to the second inner peripheral surface 19b of the first radial ball bearing 19. Here, the first radial ball bearing 19 and the rotary shaft 5 are both made of steel, and thus, the thermal expansion coefficients of them are the same. Accordingly, the small diameter portion 5a and the second inner peripheral surface 19b are hardly distorted even by thermal expansion and thermal contraction. Furthermore, in order to ensure suitable rotation of the rotary shaft 5 including the small diameter portion 5a, the cross section of the rotary shaft 5 perpendicular to the direction in which the rotating axis O extends is formed in the substantially perfect circle, which is essential. With this shape, when the shape of the second inner peripheral surface 19b is affected by the shape of the small diameter portion 5a due to an interference fit, the shape of the second inner peripheral surface 19b resembles a perfect circle than before affected. Thus, in this compressor, the small diameter portion 5a is fitted into the second inner peripheral surface 19b by the interference fit, so that the first radial ball bearing 19 suitably supports the rotary shaft 5 with the second inner peripheral surface 19b. As a result, in this compressor, runout hardly occurs in the rotary shaft 5 that rotates, so that noise generated during the operation of the compressor is suppressed.

Thus, the compressor of the first embodiment has great durability and quietness while the compressor is downsized.

In particular, in this compressor, the first boss 4 has the supply passage 4c, and thus, the lubricant oil flows through the supply passage 4c and is suitably supplied to the first radial ball bearing 19 and the rotary shaft 5. Due to this lubricant oil, friction is hardly produced between the first radial ball bearing 19 and the rotary shaft 5. In this compressor, this also enhances the durability of the first radial ball bearing 19 and makes it possible that the first radial ball bearing 19 suitably supports the rotary shaft 5.

In addition, in this compressor, the first inner peripheral surface 42 of the first boss 4 has the guide portion 42b. Here, in this compressor, when the first radial ball bearing 19 is held by the engagement portion 42a, the first radial ball bearing 19 assembled to the rotary shaft 5 enters the engagement portion 42a in the front direction of the compressor. Furthermore, the rotary shaft 5 is fixed to the rotor 7b. Accordingly, the rotary shaft 5 is affected magnetically by the rotor 7b and, by extension, by the motor 7, and thus, when the first radial ball bearing 19 enters the engagement portion 42a, the rotary shaft 5 and the first radial ball bearing 19 are easily inclined relative to the rotating axis O. In this regard, in this compressor, the guide portion 42b has the tapered shape gradually decreasing in inner diameter as the guide portion 42b extends toward the first inner peripheral surface 42 in the direction in which the rotating axis O extends, and thus, the guide portion 42b suitably guides the first radial ball bearing 19 into the engagement portion 42a while correcting the inclined postures of the rotary shaft 5 and the first radial ball bearing 19. As a result, in this compressor, the first radial ball bearing 19 easily enters the engagement portion 42a while maintained in parallel to the direction in which the rotating axis O extends. Therefore, the compressor is easily manufactured.

Second Embodiment

Figure 7:
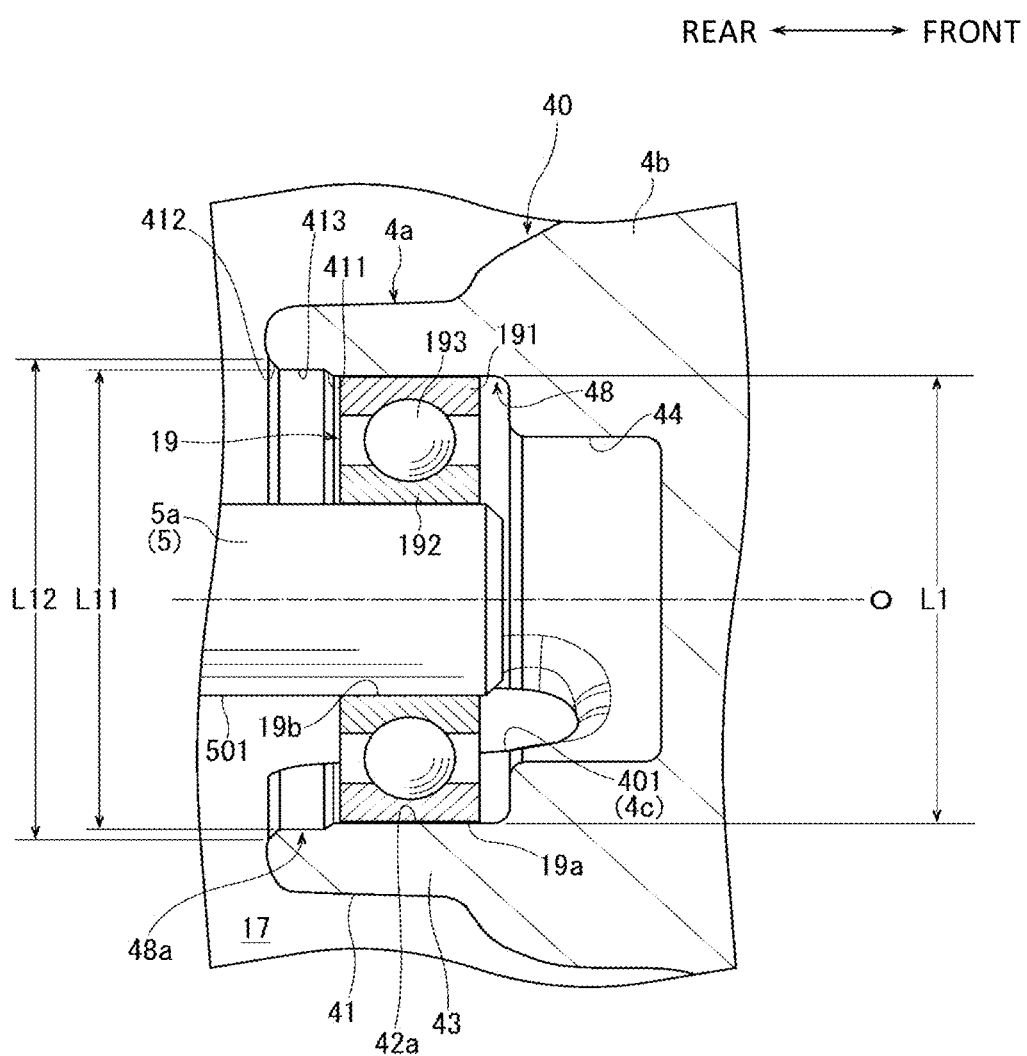
FIG. 7 is a cross-sectional view similar to FIG. 3, which illustrates a state in which a rotary shaft is supported by a bearing accommodated in a boss while the bearing is held by the boss, according to an electric compressor of a second embodiment.

In the compressor of the second embodiment, a first boss 40 illustrated in FIG. 7 is formed in the first front wall 13a instead of the first boss 4. The first boss 40 is also an example of the "boss" in the present disclosure. The first boss 40 has a first inner peripheral surface 48 formed of the engagement portion 42a and a guide portion 48a. Although not illustrated, the interference avoidance portion 46 is also formed in the first boss 40. As a result, also in the first boss 40, a distance between the first outer peripheral surface 41 and the first inner peripheral surface 48 in the radial direction of the rotary shaft 5 becomes shorter at a portion of the first boss 40 where the interference avoidance portion 46 is formed than at a portion of the first boss 40 where the interference avoidance portion 46 is not formed. That is, the first boss 40 has an asymmetrical shape.

The guide portion 48a is located behind the engagement portion 42a and connected to the engagement portion 42a. The guide portion 48a includes a first taper portion 411, a second taper portion 412, and a connection portion 413. The first taper portion 411 corresponds to a front portion of the guide portion 48a. The first taper portion 411 is connected to the engagement portion 42a. An inner diameter of a front end of the first taper portion 411, that is, an inner diameter of a connecting point of the first taper portion 411 with the engagement portion 42a, is the same as the inner diameter of the engagement portion 42a. The first taper portion 411 has a tapered shape gradually increasing in diameter over the diameter of the engagement portion 42a as the first taper portion 411 extends away from the engagement portion 42a rearward in the direction in which the rotating axis O extends. As a result, an inner diameter of a rear end of the first taper portion 411 is a first inner diameter L11, which is larger than the inner diameter of the engagement portion 42a and the outer diameter of the first radial ball bearing 19. This means that the maximum inner diameter of the first taper portion 411 is the first inner diameter L11.

The second taper portion 412 is located behind and away from the first taper portion 411. The second taper portion 412 corresponds to a rear portion of the guide portion 48a. The second taper portion 412 gradually increases in diameter over the maximum inner diameter of the first taper portion 411 as the second taper portion 412 extends rearward away from the first taper portion 411 in the direction in which the rotating axis O extends. That is, the minimum inner diameter of the second taper portion 412 is the first inner diameter L11, and the second taper portion 412 gradually increases in diameter from the first inner diameter L11 to a second inner diameter L12 as the second taper portion 412 extends away from the first taper portion 411 rearward in the direction where the rotating axis O extends. This means that the maximum inner diameter of the second taper portion 412 is the second inner diameter L12. A rear end of the second taper portion 412 is connected to a rear end of the boss main body 4a.

The connection portion 413 is located between the first taper portion 411 and the second taper portion 412. A front end of the connection portion 413 is connected to the first taper portion 411, and a rear end of the connection portion 413 is connected to the second taper portion 412. Thus, the first taper portion 411 is connected to the second taper portion 412 through the connection portion 413. Here, the connection portion 413 linearly extends between the first taper portion 411 and the second taper portion 412 without expanding or reducing the diameter of the connection portion 413. That is, the first taper portion 411 and the second taper portion 412 are connected to each other through the connection portion 413 having a constant diameter equal to the first inner diameter L11 which is the maximum inner diameter of the first taper portion 411.

In addition, in a portion of the guide portion 48a where the supply passage 4c is formed, the first taper portion 411, the second taper portion 412, and the connection portion 413 are cut out by the supply passage 4c. Other components of the compressor in the second embodiment, including other components of the first boss 40, are the same as those of the compressor in the first embodiment. The same components are denoted by the same reference numerals, and detailed descriptions of the components will be omitted.

In this compressor, the first taper portion 411 and the second taper portion 412 are connected through the connection portion 413 of the guide portion 48a, which has the constant diameter equal to the first inner diameter L11, and thus, even when the postures of the rotary shaft 5 and the first radial ball bearing 19 are inclined relative to the rotating axis O, the inclined postures of the rotary shaft 5 and the first radial ball bearing 19 are suitably corrected during a process in which the rotary shaft 5 and the first radial ball bearing 19 pass through the connection portion 413. Then, the first taper portion 411 guides the rotary shaft 5 and the first radial ball bearing 19 passing through the connection portion 413 into the engagement portion 42a while reducing the diameter of the first taper portion 411. Thus, the postures of the rotary shaft 5 and the first radial ball bearing 19 are more certainly corrected by the first taper portion 411 during the process in which the rotary shaft 5 and the first radial ball bearing 19 pass through the first taper portion 411.

The guide portion 48a has the first taper portion 411, the second taper portion 412, and the connection portion 413, and thus, in this compressor, a distance of the guide portion 48a in the direction in which the rotating axis O extends, that is, a length of the guide portion 48a in the direction in which the rotating axis O extends, is suitably ensured. Accordingly, in this compressor, the guide portion 48a further suitably guides the first radial ball bearing 19 into the engagement portion 42a. Therefore, this compressor is easily manufactured. Other operations of this compressor in the second embodiment are the same as those of the compressor in the first embodiment.

In the above description, the present disclosure has been described based on the first embodiment and the second embodiment. However, the present disclosure is not limited to the first embodiment and the second embodiment described above, and may be modified as appropriate within the scope of the present disclosure.

For example, in the compressor of the first embodiment, the first radial ball bearing 19 corresponds to the "bearing" in the present disclosure; however the present disclosure is not limited thereto. A sliding bearing may be used as the "bearing" in the present disclosure. This goes for the compressor of the second embodiment.

In the compressor of the first embodiment, the interference avoidance portion 46 is formed in the first boss 4, and thus, the first boss 4 has the asymmetrical shape; however, the present disclosure is not limited thereto. The first outer peripheral surface 41 of the boss main body 4a may be integrated with a part of the other member formed in the first front wall 13a, so that the first boss 4 may have the asymmetrical shape. That is, also in this case, the first boss 4 has the first outer peripheral surface 41 that varies in distance from the first inner peripheral surface 42 in the radial direction of the rotary shaft 5. This goes for the compressor of the second embodiment.

In the compressor of the first embodiment, the supply passage 4c has the first passage portion 401 and the second passage portion 402; however, the present disclosure is not limited thereto. The supply passage 4c may have only one of the first passage portion 401 and the second passage portion 402 or may have three or more passage portions. This goes for the compressor of the second embodiment.

In the compressor of the first embodiment, the compression part 10 is a scroll type compression part; however, the present disclosure is not limited thereto. The compression part 10 may be a vane type compression part, or the like. When the compression part 10 is a scroll type compression part, the compression part 10 may be a co-rotation scroll type compression part in which both scrolls are rotated. This goes for the compressor of the second embodiment.

In the compressor of the first embodiment, the compression part 10 compresses the refrigerant gas as the fluid; however, the present disclosure is not limited thereto. The compression part 10 may compress fluid such as air. This goes for the compressor of the second embodiment.

The present specification also includes the following disclosures.

(Supplementary Note 1)

An electric compressor including a housing, a rotary shaft rotatably supported in the housing, a motor configured to rotate the rotary shaft, and a compression part configured to compress fluid by the rotation of the rotary shaft, wherein the housing includes a boss formed in a tubular shape protruding toward the motor in an axial direction of the rotary shaft, and the boss has an inner peripheral surface in which a bearing that supports the rotary shaft is provided, characterized in that the boss has an asymmetrical shape and has an outer peripheral surface that varies in distance from the inner peripheral surface in a radial direction of the rotary shaft, and the rotary shaft is press-fitted in the bearing, and the bearing is fitted in the inner peripheral surface with a clearance between the bearing and the inner peripheral surface.

(Supplementary Note 2)

The electric compressor according to supplementary note 1, characterized in that the boss has a supply passage that extends from the outer peripheral surface to the inner peripheral surface in the radial direction of the rotary shaft and through which lubricant oil is supplied to the bearing.

(Supplementary Note 3)

The electric compressor according to supplementary note 1 or 2, characterized in that an inverter is provided in the housing, located opposite to the compression part with the motor interposed between the inverter and the compression part, and electrically connected to the motor, the housing includes a motor chamber in which the motor is accommodated, an inverter chamber in which the inverter is accommodated, and a separation wall by which the motor chamber is separated from the inverter chamber and in which the boss is formed, the separation wall has a through hole in which a hermetical sealed terminal is inserted, the motor being connected to the inverter through the hermetical sealed terminal, the motor has a stator core around which a coil is wound and a rotor that rotates integrally with the rotary shaft, the coil has coil ends protruding from opposite ends of the stator core, a terminal box electrically connected to the hermetical sealed terminal, and a lead wire extending from one of the coil ends to the terminal box, and the outer peripheral surface has a cutout and at least one of a distance between the inner peripheral surface and the through hole and a distance between the inner peripheral surface and the terminal box when the cutout is formed is different from the distance when the cutout is not formed, which forms the boss in the asymmetrical shape.

(Supplementary Note 4)

The electric compressor according to any one of supplementary notes 1 to 3, characterized in that the inner peripheral surface has an engagement portion in which the bearing is fitted with the clearance and a guide portion that guides the bearing into the engagement portion, and the guide portion has a first taper portion that gradually increases in diameter over a diameter of the engagement portion as the first taper portion extends away from the engagement portion in the axial direction of the rotary shaft, a second taper portion that is located away from the first taper portion in the axial direction of the rotary shaft and gradually increases in diameter over a maximum inner diameter of the first taper portion as the second taper portion extends away from the first taper portion, and a connection portion that is located between the first taper portion and the second taper portion and has a constant inner diameter equal to the maximum inner diameter of the first taper portion and through which the first taper portion and the second taper portion are connected.

(Supplementary Note 5)

The electric compressor according to any one of supplementary notes 1 to 4, characterized in that the bearing has an inner ring in which the rotary shaft is press-fitted, and an outer ring that is fitted in the inner peripheral surface with a clearance between the inner peripheral surface and the outer ring, and a plurality of bearing balls that each have a spherical shape and are provided between the inner ring and the outer ring.

INDUSTRIAL APPLICABILITY

The present disclosure may be used for an air conditioner of a vehicle, or the like.

What is claimed is:

1. An electric compressor comprising:
a housing;
a rotary shaft rotatably supported in the housing and extending in a front-rear direction of the housing;
a motor configured to rotate the rotary shaft; and
a compression part configured to compress fluid by the rotation of the rotary shaft,
the housing including a boss formed in a tubular shape protruding toward the motor in an axial direction of the rotary shaft, and
the boss having an inner peripheral surface in which a bearing that supports the rotary shaft is provided, wherein
the boss has an asymmetrical shape in a right-left direction of the housing,
the boss has an outer peripheral surface that varies in radial distance from the inner peripheral surface in a rotational direction of the rotary shaft,
wherein the inner peripheral surface is located radially inward from the outer peripheral surface and overlapping the outer peripheral surface along the front-rear direction of the housing, and
the rotary shaft is press-fitted in the bearing, and the bearing is fitted in the inner peripheral surface with a clearance between the bearing and the inner peripheral surface.

2. The electric compressor according to claim 1, wherein the boss has a supply passage that extends from the outer peripheral surface to the inner peripheral surface in the radial direction of the rotary shaft and through which lubricant oil is supplied to the bearing.

3. The electric compressor according to claim 1, wherein the bearing has an inner ring in which the rotary shaft is press-fitted, and an outer ring that is fitted in the inner peripheral surface with the clearance between the inner peripheral surface and the outer ring, and a plurality of bearing balls that each have a spherical shape and are provided between the inner ring and the outer ring.

4. An electric compressor comprising:
a housing;
a rotary shaft rotatably supported in the housing;
a motor configured to rotate the rotary shaft; and
a compression part configured to compress fluid by the rotation of the rotary shaft,
the housing including a boss formed in a tubular shape protruding toward the motor in an axial direction of the rotary shaft, and
the boss having an inner peripheral surface in which a bearing that supports the rotary shaft is provided, wherein
the boss has an asymmetrical shape and has an outer peripheral surface that varies in distance from the inner peripheral surface in a radial direction of the rotary shaft,
the rotary shaft is press-fitted in the bearing, and the bearing is fitted in the inner peripheral surface with a clearance between the bearing and the inner peripheral surface,
an inverter is provided in the housing, located opposite to the compression part with the motor interposed between the inverter and the compression part, and electrically connected to the motor,
the housing includes a motor chamber in which the motor is accommodated, an inverter chamber in which the inverter is accommodated, and a separation wall by which the motor chamber is separated from the inverter chamber and in which the boss is formed,
the separation wall has a through hole in which a hermetical sealed terminal is inserted, the motor being connected to the inverter through the hermetical sealed terminal,
the motor has a stator core around which a coil is wound and a rotor that rotates integrally with the rotary shaft,
the coil has coil ends protruding from opposite ends of the stator core, a terminal box electrically connected to the hermetical sealed terminal, and a lead wire extending from one of the coil ends to the terminal box, and
the outer peripheral surface has a cutout and at least one of a distance between the inner peripheral surface and the through hole and a distance between the inner peripheral surface and the terminal box when the cutout is formed is different from the distance when the cutout is not formed, in the radial direction of the rotary shaft, which forms the boss in the asymmetrical shape.

5. An electric compressor comprising:
a housing;
a rotary shaft rotatably supported in the housing;
a motor configured to rotate the rotary shaft; and
a compression part configured to compress fluid by the rotation of the rotary shaft,
the housing including a boss formed in a tubular shape protruding toward the motor in an axial direction of the rotary shaft, and
the boss having an inner peripheral surface in which a bearing that supports the rotary shaft is provided, wherein
the boss has an asymmetrical shape and has an outer peripheral surface that varies in distance from the inner peripheral surface in a radial direction of the rotary shaft,
the rotary shaft is press-fitted in the bearing, and the bearing is fitted in the inner peripheral surface with a clearance between the bearing and the inner peripheral surface,
the inner peripheral surface has an engagement portion in which the bearing is fitted with the clearance and a guide portion that guides the bearing into the engagement portion, and
the guide portion has:
a first taper portion that gradually increases in diameter over a diameter of the engagement portion as the first taper portion extends away from the engagement portion in the axial direction of the rotary shaft;
a second taper portion that is located away from the first taper portion in the axial direction of the rotary shaft and gradually increases in diameter over a maximum inner diameter of the first taper portion as the second taper portion extends away from the first taper portion; and
a connection portion that is located between the first taper portion and the second taper portion and has a constant inner diameter equal to the maximum inner diameter of the first taper portion and through which the first taper portion and the second taper portion are connected.

* * * * *